(12) United States Patent
Patel et al.

(10) Patent No.: US 7,845,223 B2
(45) Date of Patent: Dec. 7, 2010

(54) CONDENSING CHAMBER DESIGN

(75) Inventors: Ramesh Patel, San Jose, CA (US);
Albert Tsang, San Jose, CA (US);
James Sawabe, San Jose, CA (US);
Hwang Choe, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 1086 days.

(21) Appl. No.: 11/220,672

(22) Filed: Sep. 8, 2005

(65) Prior Publication Data
US 2008/0083276 A1    Apr. 10, 2008

(51) Int. Cl.
*G01F 23/00*    (2006.01)
(52) U.S. Cl. .......................................... 73/299
(58) Field of Classification Search .................. 73/301, 73/299, 747; 376/258
See application file for complete search history.

(56) References Cited

U.S. PATENT DOCUMENTS

| | | | | |
|---|---|---|---|---|
| 2,232,840 A | * | 2/1941 | Claffey | 203/2 |
| 2,678,434 A | * | 5/1954 | Rowland et. al. | 340/620 |
| 2,870,635 A | * | 1/1959 | Vollbrecht et. al. | 73/299 |
| 3,164,991 A | * | 1/1965 | Potthoff et al. | 73/297 |
| 4,299,116 A | * | 11/1981 | Baillie et al. | 73/30.04 |
| 4,332,166 A | * | 6/1982 | Lawford | 73/299 |
| 4,389,888 A | * | 6/1983 | Morooka | 73/299 |
| 4,394,346 A | * | 7/1983 | Morooka | 73/299 |
| 4,394,346 A | * | 7/1983 | Morooka | 376/258 |
| 4,927,594 A | * | 5/1990 | Heibel et al. | 376/258 |
| 5,297,174 A | * | 3/1994 | Impink et al. | 376/236 |
| 5,365,555 A | * | 11/1994 | Sawabe et al. | 376/258 |
| 5,373,539 A | * | 12/1994 | Impink et al. | 376/236 |
| 5,475,720 A | * | 12/1995 | Oldenhage et al. | 376/258 |
| 5,533,074 A | * | 7/1996 | Mansell | 376/258 |
| 5,541,969 A | * | 7/1996 | Matteson et al. | 376/258 |
| 5,566,571 A | * | 10/1996 | Kasai et al. | 73/299 |
| 5,754,609 A | * | 5/1998 | Meseth | 376/247 |
| 5,811,690 A | * | 9/1998 | Hershey | 73/861.42 |
| 5,901,603 A | * | 5/1999 | Fiedler | 73/299 |
| 6,065,335 A | * | 5/2000 | Denz et al. | 73/291 |
| 6,865,244 B2 | | 3/2005 | Meseth | |
| 2006/0266111 A1 | * | 11/2006 | Gourlay et al. | 73/299 |

FOREIGN PATENT DOCUMENTS

JP          06094506 A    *    4/1994

* cited by examiner

*Primary Examiner*—Hezron Williams
*Assistant Examiner*—Nathaniel Kolb
(74) *Attorney, Agent, or Firm*—Harness, Dickey & Pierce, P.L.C.

(57) ABSTRACT

The disclosed apparatus includes a condensing chamber (CC) that maintains a volume of a condensate obtained from vapor emitting from a vessel, for example a reactor pressure vessel (RPV). The condensing chamber is connected to a reference leg (RL), a variable leg (VL) and a vapor or steam leg (SL). RL connection provides a flow path for the CRD drive water system backfill to flow into the CC and overflow into the VL. The excess backfill and/or condensate will be returned to the vessel, typically at a point below the liquid level within the vessel. Non-condensable gases will thereby be returned from the CC to the RPV in a substantially continuous manner, thereby tending to prevent the introduction of non-condensable gas enriched liquid from the CC into the RL and improving the tolerance and reliability of the level measurements and/or reducing thermal stresses on the various CC connections.

14 Claims, 5 Drawing Sheets

CONDENSING CHAMBER DESIGN

BACKGROUND OF THE INVENTION

1. Field of the Invention

This invention relates to an apparatus for measuring liquid level in a vessel using a pressure differential, for example, the liquid level present in a reactor pressure vessel (RPV) of a boiling water reactor (BWR), advanced boiling water reactor (ABWR) or advanced boiling water reactor II (ABWR II), and, more particularly, to an apparatus having increased tolerance for non-condensable gases that may be introduced into one or more passages of the measuring apparatus.

2. Description of Related Art

A wide variety of instrumentation may and has been used to measure the level of liquids present in a vessel. In BWRs, one liquid level monitored in this fashion is the level of coolant, typically water or a dilute aqueous solution incorporating additive compounds for suppressing corrosion or improving the performance of the coolant in some fashion. In addition to reactor vessels, other applications of this technology may include, for example, chemical reactors, conventional fired boilers or other vessels from which the liquid or a component of the liquid is being evaporated along with at least one non-condensable gas, i.e., a gas that does not condense under the operating conditions maintained in the vessel.

The results of these liquid level measurements typically constitute a key parameter utilized by one or more control systems, for example a liquid level controller, a feed-liquid controller, a blow-down controller, and other controllers provided for maintaining appropriate operating conditions and/or safety margins within the monitored vessel and/or the associated system. Accordingly, the liquid level instrumentation and liquid level measurement system must operate with sufficient accuracy over a wide range of conditions, even including significant departures from the typically controlled operating regime associated with startups, shutdowns and/or errors or accidents.

The output of the liquid level instrumentation and measurement system will typically be routed to various control machinery and equipment including, for example, reactor protection systems associated with nuclear reactors. These reactor protection systems typically include a combination of vessels, pipes, sensors and electronics that will cooperate to maintain the safe operation of the reactor. Accordingly, it is important that the liquid level instrumentation measurement system produce signals that accurately reflect the actual status of the liquid level within the monitored vessel.

Given the importance of the accurate determination and indication of the actual liquid level within the monitored vessel, various prior art methods and apparatus have been developed in an attempt to provide the desired liquid level information. One such prior art apparatus is illustrated in FIG. 1 as applied to a pressurized liquid reactor or a boiling water reactor.

As illustrated in FIG. 1, the liquid level instrumentation measurement system 1 is attached to a pressure vessel 10. Pressure vessel 10 and most of liquid level instrumentation measurement system 1 are disposed in a drywell (or primary containment) structure 12 adjacent the reactor building 14. A portion of liquid level instrumentation measurement system 1, including a reference leg 16 and a differential pressure detector 18, is located in reactor building 14. Coolant 20 is supplied to pressure vessel 10 to establish a liquid level 22, with the coolant being confined in the lower space 26 of pressure vessel 10 below liquid level 22.

Coolant 20 is heated in the pressure vessel 10 to produce steam or vapor 30 that collects in the upper space 28 of pressure vessel 10 above liquid level 22. The liquid level instrumentation measurement system 1 is attached to pressure vessel 10 through an upper tap 36, above liquid level 22, via an upwardly inclined steam inlet 38 that is surrounded by insulation 40 that directs the steam 30 into at least one condensing chamber 100. A reference leg 16 connects the condensing chamber 50 to a differential pressure detector 18 with liquid formed by the condensing steam 30 being returned to the pressure vessel 10 via variable leg 44 through a lower tap 42 positioned below the nominal liquid level 22. The liquid level within the pressure vessel 10 may then be determined by measuring the difference in pressure between two columns of liquid maintained in the reference leg and the variable leg.

Another embodiment for measuring the liquid level within a vessel is illustrated in FIG. 2. As illustrated in FIG. 2, a condensation vessel 1 is connected through a steam line 4 to a reactor pressure vessel 2. The steam line 4 of the condensation vessel 1 opens into the reactor pressure vessel 2 at a pressure vessel mouth 15 and is connected to the condensation vessel 1 through an entrance 5. The steam line 4 runs in an ascending gradient from the pressure vessel mouth 15 to the entrance 5 of the condensation vessel 1. Within the condensation vessel 1, a condensate zone 6 is provided which is continuously filled with condensate up to the height of the entrance 5 with excess condensate flowing directly back into the reactor pressure vessel 2 through the steam line 4. A steam zone 3 is provided above the condensate zone 6 whereby steam is constantly introduced into this region from the reactor pressure vessel 2 through the steam line 4.

The steam line is typically configured to be relatively short and of sufficient diameter whereby there is essentially no pressure drop between the reactor pressure vessel and the condensation vessel 1. Accordingly, the pressure within the steam zone 3 will typically correspond closely to the pressure within the reactor pressure vessel 2. The steam zone 3 is connected to a differential pressure transducer 20 which serves for measuring the filling level, through a differential pressure measuring line 17 provided below the condensate zone 6. A discharge device 7 of the condensation vessel 1 has an additional condensate zone 7a provided at an upper end 11 of the steam zone 3.

Directly adjacent the upper end 11 is a cooling stage 9, adjacent which is a U-line 10, a siphon that merges into a condensate discharge line 8. The condensate discharge line 8 passes through the condensation vessel 1 above the condensate zone 6 and runs, in the steam line 4, from the entrance 5 of the condensation vessel into the reactor pressure vessel 2. The U-line 10 is filled with additional condensate to such an extent that some of this additional condensate constantly flows back into the reactor pressure vessel 2 through the condensate discharge line 8. The additional condensate collected in the U-line 10 will contain, in dissolved form, the non-condensable gas(es) which enter the condensation vessel 1 through the steam line 4 from the reactor pressure vessel 2 along with the steam. These non-condensable gases, as a result of their low density will tend to accumulate in the upper end 11 of the steam zone 3, from where it passes together with condensing steam into the U-line 10. In this manner, non-condensable gases are removed from the condensation vessel 1 through the additional condensate zone 7a and are fed back into the reactor pressure vessel 2, thereby reducing the accumulation of non-condensable gas in the condensation vessel 1

Another embodiment is illustrated in FIG. 3. As shown in FIG. 3, a reactor pressure vessel, of which only a lateral outer wall 2 is illustrated, is filled with water up to a normal filling level N during normal operation. Above the filling level N, the interior 4 of the pressure vessel is filled with steam. When an underfill condition is detected, i.e., the detected level is below a critical filling level K, additional cooling is passively enabled in order to ensure sufficient cooling of the reactor pressure vessel. An essential element for activating the cooling measure is the configuration of a differential-pressure measurement pipe 8 having an upside-down U-pipe configuration provided parallel to the outer wall 2. The differential-pressure measurement pipe 8 contains a first pipe leg 8A that merges via an arcuate upper connecting portion 8B into a second pipe leg 8C. The two pipe legs 8A, 8C run preferably parallel to one another and also parallel to the outer wall 2. They extend in this case from below in the region of the critical filling level K upward as far as a height below the normal filling level N. While the second pipe leg 8C is essentially closed on an end face, the first pipe leg 8A is flow-connected to the interior 4. The differential-pressure measurement pipe 8 is therefore closed at one end and is connected only at its other end to the interior 4. It is essential, in this case, that the first pipe leg 8A be flow-connected to the interior 4 in the region of the critical filling level K.

The first pipe leg 8A is connected indirectly to the interior 4 of the pressure vessel 2. Specifically, the first pipe leg 8A extends with its lower region into a jacket pipe 12 that surrounds the pipe leg and ends with its lower end 10 in the jacket pipe. The lower end 10 is open to from a flow path out of the first pipe leg 8A into the jacket pipe 12 with the upper end of the jacket pipe 12 being closed relative to the first pipe leg 8A and configured to be leak-tight. The jacket pipe 12, in turn, provides a first flow path 14A into the riser pipe 16 below the critical filling level K with the upper region of the jacket pipe 12 being similarly connected to the riser pipe 16 above the critical filling level K via a second flow path 14B. The riser pipe 16, in turn, is connected to the interior 4 of the reactor pressure vessel at a point below the critical filling level K via a lower issue region 16A and above the critical filling level K by an upper issue region 16B. The lower issue region 16A is followed first by a siphon-shaped region of the riser pipe 16 that also runs parallel to the outer wall 2 (and therefore also parallels the differential-pressure measurement pipe 8 upward as far as the upper issue region 16B).

A measurement device 18 configured for detecting the differential pressure between the two pipe legs 8A, 8C is provided. The measurement device 18 is also connected via a first measurement line 18A to the arcuate first flow path 14A in a region in where it issues into the riser pipe 16. Furthermore, the measurement device 18 is connected via a second measurement line 18B to the lower end of the second pipe leg 8C. The lower end is closed with the exception of the flow connection to the measurement device 18. The pressure condition present in the two pipe legs 8A, 8C is communicated via the corresponding measurement lines 18A, 18B to the measurement device 18.

The measurement device 18 was configured as a passive pulse generator for converting a change in the sensed pressure differential between the two measurement lines 18A, 18B into an axial movement. For example, the measurement device 18 may be provided with a pressure plate 19, one side of which is acted upon by the pressure from the first pipe leg 8A and the other side of which is acted upon by the pressure from the second pipe leg 8C. In the event of a change in the differential pressure between the two pipe legs 8A, 8C, an axial displacement of the pressure plate 19 will occur which, in turn, acts on a pneumatic valve 22 that is disposed in a compressed-gas line 24. Normally pressurized nitrogen is provided and maintained in the compressed-gas line 24. The compressed-gas line 24 leads to a shutoff valve 26 operable for opening/closing a flood line 28. A venting valve 30 may also be provided at the highest point of the differential-pressure measurement pipe 8 (i.e., the upper point of the arcuate portion 8B).

During normal operation of the apparatus illustrated in FIG. 3, the reactor pressure vessel is filled with coolant to a normal filling level N that lies above the arcuate portion 8B. When the differential-pressure measurement pipe 8 is being filled for the first time, water penetrates from the interior 4, via the lower issue region 16A, via the riser pipe 16 and via the first flow path 14A, into the lower end 10 of the first pipe leg 8A. The differential-pressure measurement pipe 8, together with its two pipe legs 8A, 8C, is thereby filled completely with water. The air and/or other non-condensables initially present in the differential-pressure measurement pipe 8 can escape via the venting valve 30 during initial filling. Accordingly, the measurement system can be provided with substantially no gas non-condensable gas remaining in the differential-pressure measurement pipe 8. In this normal operating state, the pressure values in the two pipe legs 8A, 8C which are detected by the measurement device 18 via the two measurement lines 18A, 18B are also determined by the pressure of the water columns contained in the two pipe legs 8A, 8C.

If the filling level in the interior 4 falls to a reduced filling level R between the normal filling level N and the critical filling level K, the reduced filling level R will correspond generally to the liquid level established in the riser pipe 16 as a result of the fluidic communicating between the riser pipe and the interior 4. Because the jacket pipe 12 is, in turn, in fluidic connection with the riser pipe 16 via the two flow paths 14A, 14B, the reduced filling level R will also be reflected in the jacket pipe 12. Accordingly, the jacket pipe 12 will be filled with water below and steam above the reduced filling level R, thereby heating the first pipe leg 8A. When steam flows into the jacket pipe 12 for the first time via the second flow path 14B, the steam condenses on the cold first pipe leg 8A to form condensate that flows downwardly inside the jacket pipe 12 and passes back into the reactor pressure vessel.

Non-Condensable Gas Accumulation

As noted above, the accumulation of non-condensable gases in the condensing chamber and, consequently, their presence in the reference line and/or the variable line can lead to inaccuracies in the measurement of the liquid level of the monitored vessel. As reflected by the prior art efforts discussed above, various apparatus have been developed for suppressing the accumulation of non-condensable gases and/or mitigating the accumulation, typically by purging (e.g., blow down operations) and/or dissolving the gases in the liquid present in the system.

Steam produced in pressure vessels typically contains trace amounts of non-condensable gases. In the nuclear industry for example, non-condensable gases are generated as a byproduct of the fission process and will tend to be a generally stoichiometric mixture of hydrogen and oxygen (i.e., 2:1), but will generally also include smaller amounts of other elements such as nitrogen). In other applications, the source of these non-condensable gases, primarily oxygen and nitrogen, is air. Once the non-condensable gases are in the system, the steam or vapor from the vessel will tend to carry them into the condensing chamber.

As the steam or other vapor enters condensing chamber and condenses to form a liquid condensate the non-condensable gases remain in a gaseous state and begin to accumulate in the condensing chamber, thereby increasing the concentration of the non-condensable gases in the vapor space of the condensing chamber. As the concentration of the non-condensable gases increases, a portion of the gases will dissolve in the liquid present in the condensing chamber. The condensate (carrying the dissolved gases) will flow into one or more other portions of the apparatus and, in this manner may be returned to the monitored vessel.

As reflected in the prior art apparatus discussed above, the primary mechanism for removing the non-condensable gases from condensing chamber is via the dissolved gases contained in a spillover flow of excess condensate. When such a system is working properly the accumulation of the non-condensable gases will be maintained at a level near the equilibrium level. Under such equilibrium conditions, the concentrations of oxygen and hydrogen present in the steam entering the condensing chamber will typically be in the range of about 13 ppmv and 25 ppmv (parts per million by volume), respectively in accord with Henry's Law.

Non-condensable gases can, however, accumulate in condensing chamber at levels above the ideal equilibrium condition if, for example, a leak in the reference leg or elsewhere in the system reduces spillover flow, thereby limiting the removal of non-condensable gas removal or allowing the introduction of additional gases. Another source for the accumulation of non-condensable gases is simply the function of Henry's Law which provides that the amount of gas dissolved in liquid will be proportional to the partial pressure of gas above the liquid surface. Accordingly, gas dissolved in a liquid may be released or "stripped" from the liquid when the liquid enters a region in which the partial pressure of non-condensable gases is less than the concentration maintained in condensing chamber.

Migration Into The Reference Leg

When the concentration of the non-condensable gas in the condensate exceeds the equilibrium value and the condensate is distributed into other portions of the system, for example as steam condensate flows from the condensing chamber into reference leg in order to maintain the reference leg liquid level, there is a potential for non-condensable gases dissolved in the condensate to be carried into reference leg and/or other portions of the system. If this dissolved or entrained gas is released from solution, it may accumulate in reference leg of the liquid level instrumentation measurement system, thereby altering the measured liquid level and providing erratic and/or inaccurate liquid level readings.

In summary, the simultaneous occurrence of three conditions will increase the likelihood that non-condensable gases will be released in the reference leg of a pressure differential liquid level measuring system including: (1) an elevated level of non-condensable gases must exist in condensing chamber; (2) the non-condensable gases must be drawn into reference leg by, for example, a small leak; and (3) a subsequent depressurization of the non-condensable gas saturated liquid within the reference leg. These conditions can and do occur and can result in significant measurement errors, particularly during non-routine operations such as rapid depressurization and normal shutdowns (typically involving a relatively slow depressurization). The degree of the error induced by the release of gas in the reference leg will depend on a combination of factors including the geometry of reference leg, the amount and composition of initial non-condensable gases, and the depressurization rate. Liquid loss or displacement in the reference leg will directly impact the reference pressure sensed by differential pressure detector and, consequently, the measurement of liquid level in monitored vessel will be sensed as containing more liquid, in some instances much more liquid, than is actually present in the vessel.

In nuclear power operations, the inaccurate measurement of liquid level within a RPV during normal operations presents one set of problems. Because operators rely on such measurements when implementing emergency operating procedures during abnormal conditions to determine whether adequate core cooling is achieved, however, an erroneous indication of a higher liquid level would result in ambiguous or misleading information to the operators during a dynamic depressurization event. This creates another, potentially catastrophic, set of problems. Clearly, improvement of liquid level measurement systems may include procedures and/or structures intended to prevent or suppress the accumulation of non-condensable gases in the reference leg will produce more reliable measurements and improve the margin of safety for plant operation.

A number of alternative modifications to liquid level measurement systems have been proposed to address the problem of measurement errors caused by non-condensable gases. One proposal involves venting condensing chamber to the main steam line, thereby using positive steam flow through condensing chamber to prevent non-condensable gases from accumulating in condensing chamber. A second proposal involves positioning an accumulator below the condensing chamber to reduce the liquid level measurement error to a small, quantifiable value. A third proposal involves manually backfilling the reference leg with regular frequency. A fourth proposal involves an automatic keepfill system that would provide continuous backfill of reference leg. A fifth proposal involves installing a temperature monitor in condensing chamber and backfilling only when the temperature decreases. Sixth proposal involves repositioning the condensing chamber below the vessel nozzle. A seventh proposal involves venting condensing chamber to variable leg using steam flow through condensing chamber to prevent accumulation of non-condensable gases.

Each of these proposals, however, has inherent limitations with regard to their feasibility, expense and/or performance. Accordingly, a need remains for an improved condensation chamber design that will reduce the likelihood of non-condensable gases coming out of solution in the reference line and thereby provide more dependable liquid level readings using a differential pressure measuring system.

BRIEF DESCRIPTION OF THE DRAWINGS

The features and operation of the invention will be apparent from the following more detailed description of various embodiments of the invention and as illustrated in the accompanying drawings. These drawings are provided for illustrative purposes only and are not drawn to scale. The spatial relationships and relative sizing of the elements illustrated in the various embodiments may have been reduced, expanded or rearranged to improve the clarity of the figure with respect to the corresponding description. The figures, therefore, should not be interpreted as accurately reflecting the relative sizing or positioning of the corresponding structural elements that could be encompassed by the example embodiments of the invention.

The examples discussed below and/or illustrated in the patent drawings are provided so that this disclosure will be thorough and complete, and will fully convey the scope of the invention to those skilled in the art. The principles and features of this invention may be employed in varied and numerous embodiments without departing from the scope of the invention. Indeed, those of ordinary skill in the art will readily appreciate that various of the components, features and structures illustrated in the figures may, in turn, be selectively combined to produce additional exemplary production line configurations and/or products that have not been illustrated in the interest of brevity, but which are wholly consistent with the mechanics and principles illustrated and described herein and therefore within the scope and spirit of the invention.

DETAILED DESCRIPTION OF EXAMPLE EMBODIMENTS

Figure 1:
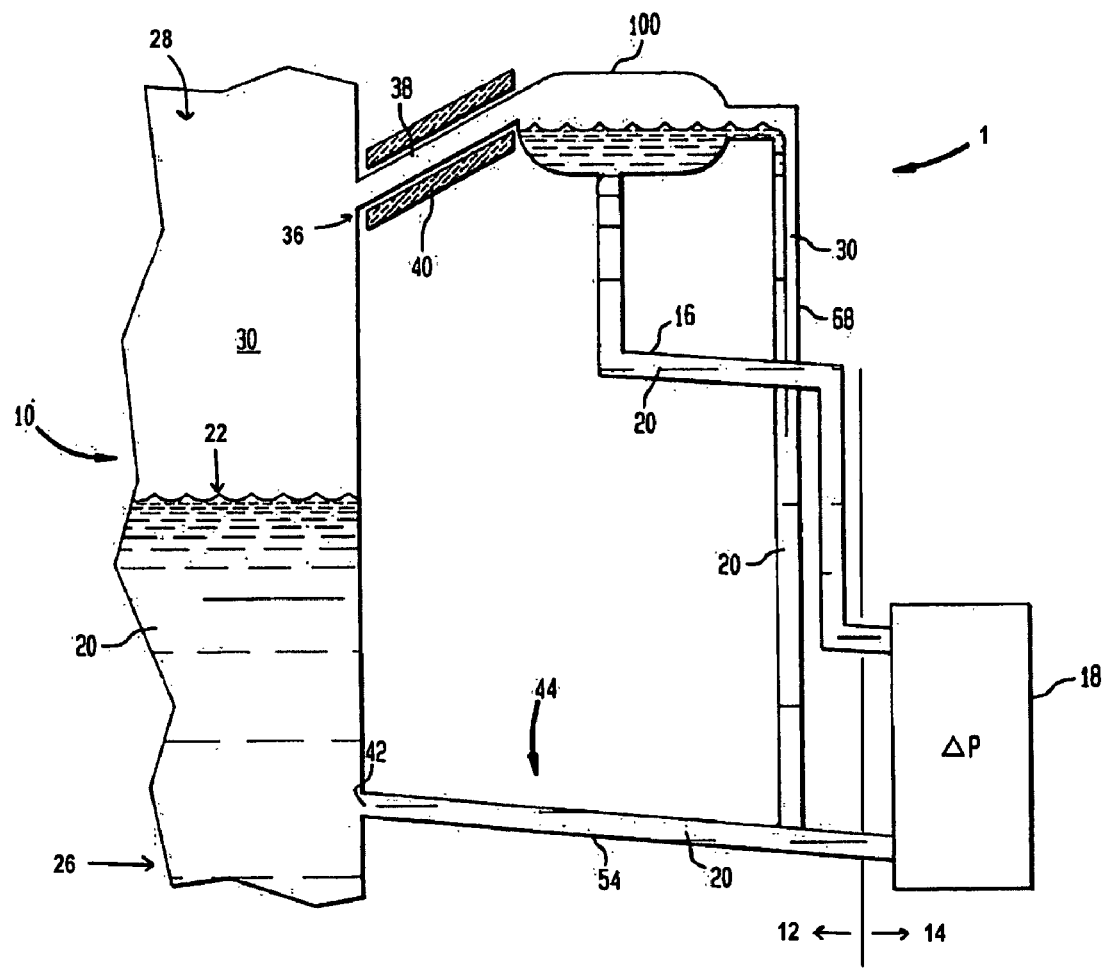
FIGS. 1-3 illustrate certain prior art attempts to measure the liquid level within a vessel using differential pressure between a reference leg and a variable leg.
Figure 2:
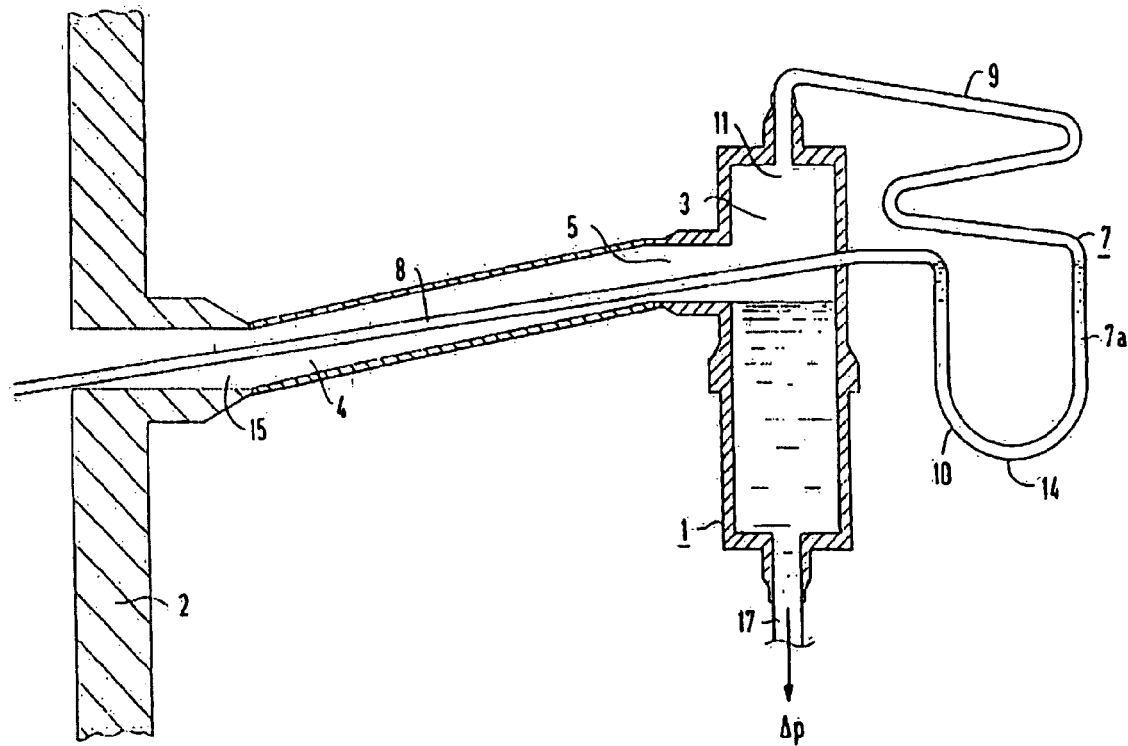
Figure 3:
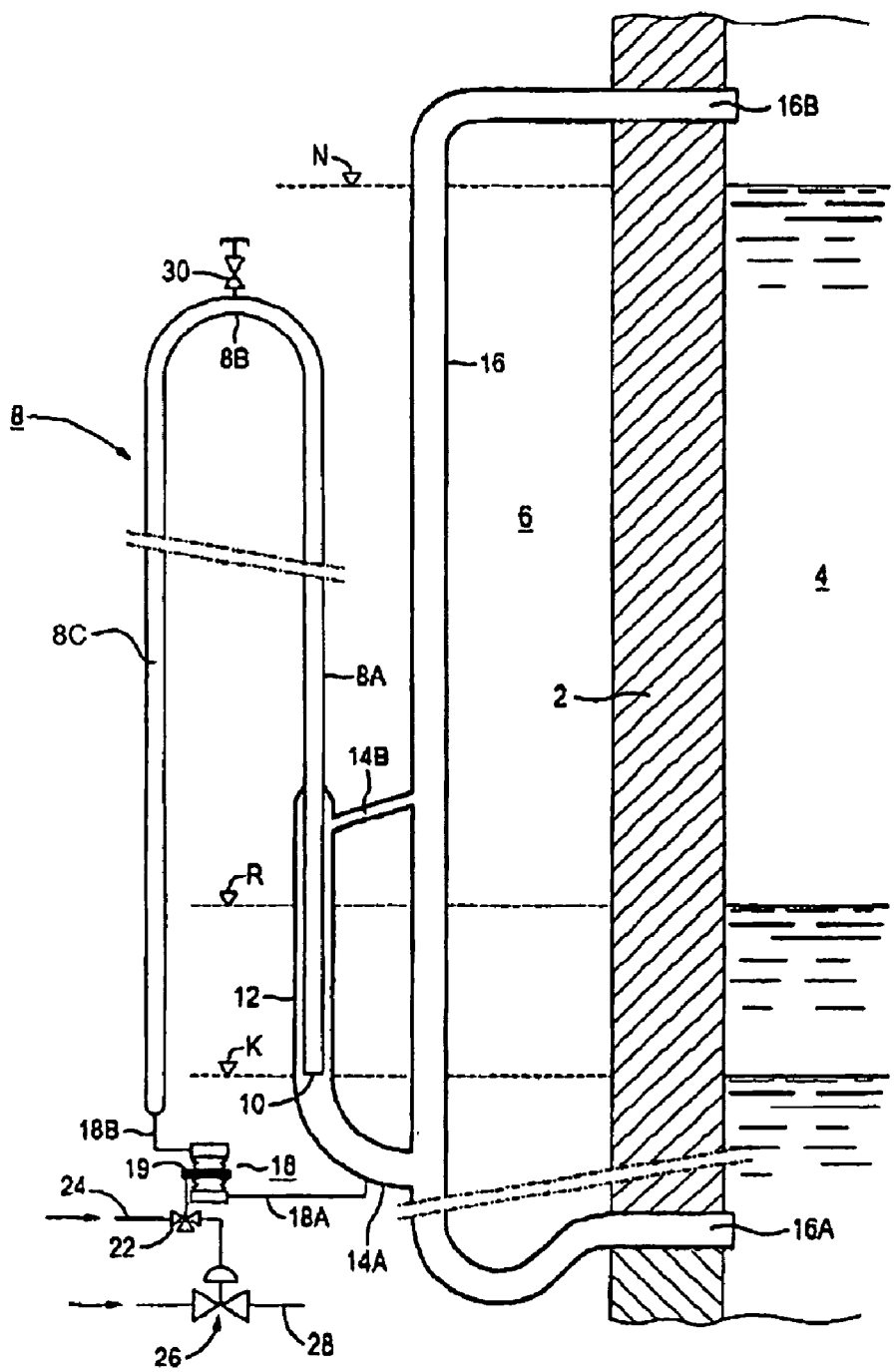
Figure 4:
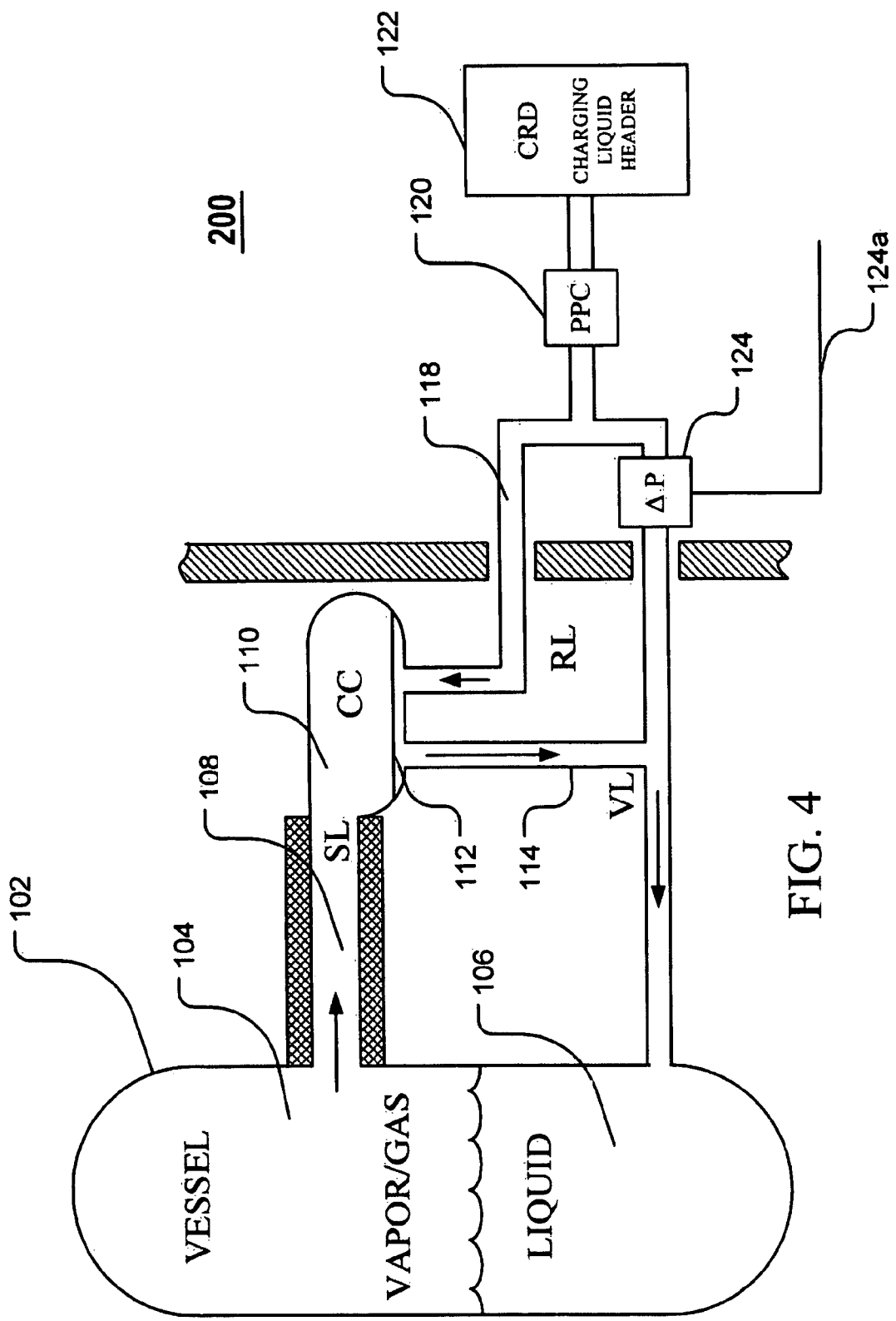
FIG. 4 is a schematic illustration of an exemplary apparatus configured according to an embodiment of the invention.

As illustrated in FIG. 4, an embodiment of a liquid level measuring system 200 according to the invention will include a monitored vessel 102, such as the RPV of an advanced boiling water reactor (ABWR). The monitored vessel 102 will include a lower portion 106 containing a liquid and upper portion 104 primarily containing vapor or steam generated by the evaporation of the liquid. The improved condensation chamber (CC) 110 is a smaller vessel with at least three connections which include connections to a reference leg (RL) 118, a variable leg (VL) 114 and a steam leg (SL) 108.

The RL 118 provides a path for liquid from the make up water system such as from a control rod drive (CRD) drive water system 122 to flow through control valve (PPC) 120 into the CC 110 and begin to accumulate in the CC along with any condensate produced within the CC. The VL 114, in turn, allows excess liquid to flow from the CC 110 and back into the liquid portion 106 of the monitored vessel 102, thereby maintained both a substantially constant fluid level 112 within the CC (and also the RL 118) and a liquid level within the lower portion of the VL that generally corresponds to the liquid level in the monitored vessel.

The liquid level within the monitored vessel 102 may then be determined by evaluating the pressure differential (ΔP) determined by sensor 124 between the VL 114, the lower level corresponding to the level within the monitored vessel, and the RL 118, a substantially constant value determined by the relative height of the surface of the liquid maintained within the CC 110. The output from the sensor 124 may be transmitted continuously, periodically and/or on demand to appropriate logging and/or control devices through line 124a. As will be appreciated, this difference depends on the relative placement, internal configuration and liquid load of the CC 110 and the monitored vessel 102 respectively.

The opening from the CC 110 into the VL 114 opening is configured whereby the VL opening is positioned at a higher relative position than the opening from the RL 118 into the CC. The VL opening is also positioned at a lower relative position than the opening from the SL 108. The SL 108 is connected to the RPV instrument line nozzle safe end. Non-condensable gases accumulating in the CC 110 during operation of the vessel and/or system will be generally continuously dissolved in and/or entrained in the liquid entering the CC from the RL 118 and/or the condensate forming in the CC will be carried with the overflow through the VL 114 and returned to the lower portion 106 of the monitored vessel 102.

The improved CC design will prevent any downward flow of the potentially non-condensable gases enriched water present in the CC 110 from entering the RL opening within the CC. Further, introduction of water through the RL 118 and the "circulating" nature of the movement of fluids through the disclosed system, it is expected that the improved CC design will also reduce the degree of thermal stresses experienced by the CC/line connections during continuous operation. Further, the non-condensable gases accumulating in the CC 110 will tend be continuously returned to the RPV through the SL 108 through simple convection due to their relative bouyancy.

Figure 5:
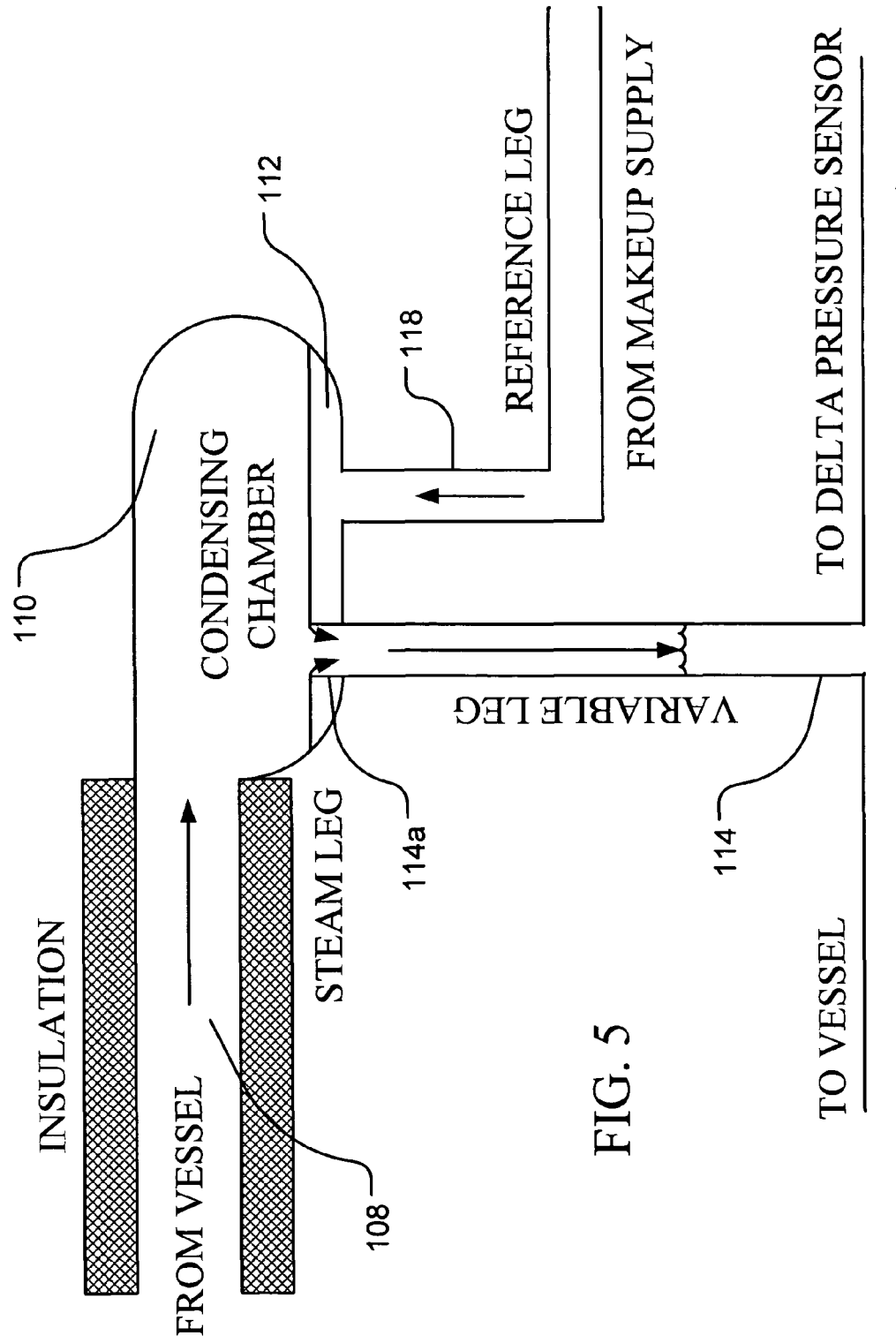
FIG. 5 is a schematic representation of an exemplary condensation chamber configuration according to an embodiment of the invention suitable for use in the apparatus illustrated in FIG. 4 or other apparatus configured according to the invention.

A more detailed view of an exemplary embodiment of a condensation chamber according to the invention is illustrated in FIG. 5 which generally corresponds to a portion of FIG. 4. As illustrated in FIG. 5, the SL 108 extending from the monitored vessel 102 (depicted in FIG. 4, but not shown in FIG. 5) to the CC 110 will typically be relatively short, insulated and of sufficient diameter to avoid condensation of the vapor or steam before reaching the CC. Although not shown, a portion of the CC 110 may be provided with heat transfer means, typically utilizing forced and/or natural convection, for cooling one or more inner surfaces of the CC to a temperature sufficient to condense the vapor or steam entering from the monitored vessel 102. As also illustrated in FIG. 5, the VL 114 may be provided with a projection, dam or other structure within the CC 110 that effectively raises the level of the opening into the VL relative to the opening into the CC provided for the RL 118.

As will be appreciated, a wide range of fittings and CC configurations may be utilized to establish this vertical separation between the two openings. As will also be appreciated, the size of the CC 110, the relative temperatures and flow rates of the liquid entering from the RL 118 and the rate at which condensate is being produced within the CC will determine to some extent the range of liquid temperatures that will be applied to the various components. Through selection of appropriate temperatures and flow rates, one skilled in the art would be able to reduce the range of temperatures to which the components will be exposed during operation, thereby providing way to reduce the thermal stress on the components.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. The invention will work, for example, in any application where a need exists to measure liquid levels under high pressure while avoiding the effect of non-condensable gases. It is not restricted to steam and liquid. Nor is it restricted to the utility industry.

We claim:

1. A liquid level measurement system for measuring a liquid level in a monitored vessel that contains a volume of liquid having an upper surface, and vapor with non-condensable gases comprising:
    a condensing chamber configured to hold a first volume of liquid and to condense the vapor;
    a steam leg extending between the monitored vessel and the condensing chamber for introducing the vapor and non-condensable gases into the condensing chamber;
    a variable leg for receiving liquid from the condensing chamber and introducing the received liquid into the monitored vessel at a point below the upper surface of the liquid;
    a reference leg for receiving liquid from a liquid source and introducing the liquid into the condensing chamber; and a differential pressure sensor arranged between the variable leg and the reference leg for measuring a pressure difference.

2. The liquid level measurement system for measuring a liquid level according to claim 1, wherein:
the variable leg receives liquid from the condensing chamber through a first opening provided in the condensing chamber; and
the reference leg introduces the liquid into the condensing chamber through a second opening;
wherein the first opening arranged above the second opening by a vertical separation distance $D_v$.

3. The liquid level measurement system for measuring a liquid level according to claim 1, wherein:
the monitored vessel is a reactor pressure vessel (RPV);
the liquid is an aqueous solution; and
the liquid source provides the aqueous solution having sub-equilibrium concentrations of the non-condensable gases.

4. The liquid level measurement system for measuring a liquid level according to claim 1, wherein:
the condensing chamber includes structure that increases an absorption rate of the non-condensable gases into the liquid.

5. The liquid level measurement system for measuring a liquid level according to claim 4, wherein:
the structure includes an agitator for mixing the liquid and the non-condensable gases.

6. The liquid level measurement system for measuring a liquid level according to claim 4, wherein:
the structure increases an effective contact area between the liquid and the non-condensable gases.

7. The liquid level measurement system for measuring a liquid level according to claim 3, wherein:
the liquid source provides polished condensed liquid.

8. The liquid level measurement system for measuring a liquid level according to claim 1, wherein:
the steam line has a generally horizontal configuration.

9. The liquid level measurement system for measuring a liquid level according to claim 1, wherein:
the steam leg is inclined downwardly between the monitored vessel and the condensing chamber 10. A method for measuring a liquid level in a monitored vessel that contains a volume of liquid having an upper surface, and vapor with non-condensable gases comprising:
introducing vapor from the monitored vessel into a condensing chamber and condensing a portion of the vapor to form liquid at a first rate $L_s$;
continuously introducing liquid into the condensing chamber, from a liquid source, at a second rate $L_r$ through a reference leg;
continuously removing liquid from the condensing chamber at a third rate $L_v$ through a variable leg and returning it to the monitored vessel, wherein, on average, the expression $$L_s + L_r = L_v$$

is satisfied, thereby maintaining an average reference liquid level in the condensing chamber and establishing a variable liquid level in the variable leg; and
sensing a pressure difference between the reference liquid level and the variable liquid level.

11. The method for measuring a liquid level in a monitored vessel according to claim 10, further comprising;
treating the liquid supplied through the reference leg to establish sub-equilibrium concentrations of the non-condensable gases in the liquid before entering the reference leg.

12. The method for measuring a liquid level in a monitored vessel according to claim 10, further comprising;
treating the liquid supplied through the reference leg whereby the concentrations of non-condensable gases in the liquid are below the equilibrium concentrations.

13. The method for measuring a liquid level in a monitored vessel according to claim 10, further comprising;
agitating the liquid and the non-condensable gases in the condensing chamber.

14. The method for measuring a liquid level in a monitored vessel according to claim 10, further comprising;
increasing an effective contact area between the liquid and the non-condensable gases.

* * * * *